(12) United States Patent
Liu et al.

(10) Patent No.: US 9,210,310 B2
(45) Date of Patent: Dec. 8, 2015

(54) IMAGE CAPTURING MODULE (71) Applicant: LITE-ON TECHNOLOGY CORPORATION, Taipei (TW)

(72) Inventors: Ming-Lang Liu, New Taipei (TW); Ying-Chieh Chen, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 14/254,921

(22) Filed: Apr. 17, 2014

(65) Prior Publication Data

US 2015/0116581 A1    Apr. 30, 2015

(30) Foreign Application Priority Data

Oct. 30, 2013    (TW) .............................. 102220193 U (51) Int. Cl.
*H04N 5/225* (2006.01)
*H04N 5/232* (2006.01)
*G03B 13/36* (2006.01)

(52) U.S. Cl.
CPC .............. *H04N 5/2254* (2013.01); *G03B 13/36* (2013.01); *H04N 5/2253* (2013.01); *H04N 5/23287* (2013.01)

(58) Field of Classification Search
CPC . H04N 5/2253; H04N 5/2254; H04N 5/2257; H04M 1/0264; G03B 3/10
See application file for complete search history.

(56) References Cited

U.S. PATENT DOCUMENTS

| 7,515,366 | B2 * | 4/2009 | Chang ............................ 359/824 |
| 2006/0146170 | A1 * | 7/2006 | Saito et al. ..................... 348/340 |
| 2014/0117479 | A1 * | 5/2014 | Jan ................................. 257/432 |

* cited by examiner

*Primary Examiner* — Paul Berardesca
(74) *Attorney, Agent, or Firm* — Li & Cai Intellectual Property (USA) Office (57) ABSTRACT

An image capturing module includes a circuit substrate, an image sensing element, an actuator module, a lens assembly and a light transmitting element. The image sensing element is disposed on the circuit substrate. The actuator module includes a holder disposed on the circuit substrate. The lens assembly is movably disposed inside the holder. The light transmitting element is disposed inside the holder and between the lens assembly and the image sensing element. The holder has a plurality of first protrusion portions and first recess portions that are alternately arranged on the inner surface of the holder. The lens assembly has a plurality of second protrusion portions and second recess portions that are respectively corresponding to the first recess portions and the first protrusion portions and alternately arranged on the bottom side of the lens assembly.

15 Claims, 8 Drawing Sheets

IMAGE CAPTURING MODULE

BACKGROUND OF THE INVENTION

1. Field of the Invention

The instant disclosure relates to an image capturing module, and more particularly to an image capturing module for reducing the opportunity of imaging the particles on the light transmitting element.

2. Description of Related Art

Recently, it becomes more and more popular for portable devices such as mobile phones or PDA to be equipped with an image capturing module. Furthermore, since the market requires these portable devices to have more powerful functions and smaller sizes, it is necessary for the image capturing module to generate high quality pictures and to be small size. One improvement of picture quality is to increase the number of pixel. Another improvement is related to the definition of the image. Thus, the image capturing module of a portable device also develops from a fixed-focus mode to auto-focus mode or even optical zoom mode.

The auto-focus mode moves the lens in the image capturing module suitably according to various distances of targets, whereby the optical image of the selected target can be focused correctly on an image sensor so as to generate a clear image. The common ways of actuating the lens to move in the image capturing module include actuating by a stepping motor, piezoelectric motor and voice coil motor (VCM). However, the distance from the filter to the image sensor is very small, thus the opportunity of imaging the particles on the filter is increased.

SUMMARY OF THE INVENTION

One aspect of the instant disclosure relates to an image capturing module for reducing the opportunity of imaging the particles on the light transmitting element.

One of the embodiments of the instant disclosure provides an image capturing module, comprising: a circuit substrate, an image sensing element, an actuator module, a lens assembly and a light transmitting element. The image sensing element is disposed on the circuit substrate and electrically connected to the circuit substrate. The actuator module includes a holder disposed on the circuit substrate. The lens assembly is movably disposed inside the holder. The light transmitting element is disposed inside the holder and between the lens assembly and the image sensing element. The holder has a plurality of first protrusion portions and a plurality of first recess portions, and the first protrusion portions and the first recess portions are alternately arranged on the inner surface of the holder. The lens assembly has a plurality of second protrusion portions that are respectively corresponding to the first recess portions and a plurality of second recess portions that are respectively corresponding to the first protrusion portions, and the second protrusion portions and the second recess portions are alternately arranged on the bottom side of the lens assembly.

Therefore, because the designs of alternately placing the first protrusion portions and the first recess portions on the inner surface of the holder and alternately placing the second protrusion portions and the second recess portions on the bottom side of the lens assembly, the distance from the light transmitting element to the image sensing element is increased without changing the thickness of the light transmitting element, the opportunity of imaging the particles on the light transmitting element is decreased and the image quality and the production yield are increased.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Referring to FIG. 1 to FIG. 7, the instant disclosure provides an image capturing module M that may be applied to an auto focus camera module structure or an image stabilization camera module structure. The image capturing module M comprises a circuit substrate 1, an image sensing element 2, an actuator module 3, a lens assembly 4 and a light transmitting element 5.

First, referring to FIG. 1 to FIG. 4, the image sensing element 2 is disposed on the circuit substrate 1 and electrically connected to the circuit substrate 1. For example, the image sensing element 2 may be a CMOS (Complementary Metal-Oxide-Semiconductor) image sensing chip, and it can be adhesively disposed on the circuit substrate 1 through any type of adhesive material (not shown). In addition, the circuit substrate 1 has a plurality of conductive pads (not shown) disposed on the surface (such as the top surface) of the circuit substrate 1, the image sensing element 2 has a plurality of conductive pads (not shown) disposed on the surface (such as the top surface) of the image sensing element 2, and each conductive pad (not shown) of the image sensing element 2 is electrically connected to the corresponding conducive pad (not shown) of the circuit substrate 1 through corresponding conducive wire (not shown), thus the image sensing element 2 is electrically connected with the circuit substrate 1 through the conductive wires (not shown). It is worth noting that the image sensing element 2 also can be electrically connected with the circuit substrate 1 by CSP (Chip Scale Package), BGA (Ball Grid Array) or FC (Flip Chip) etc. for the other embodiments, but it is merely an example and is not meant to limit the instant disclosure.

Figure 5:
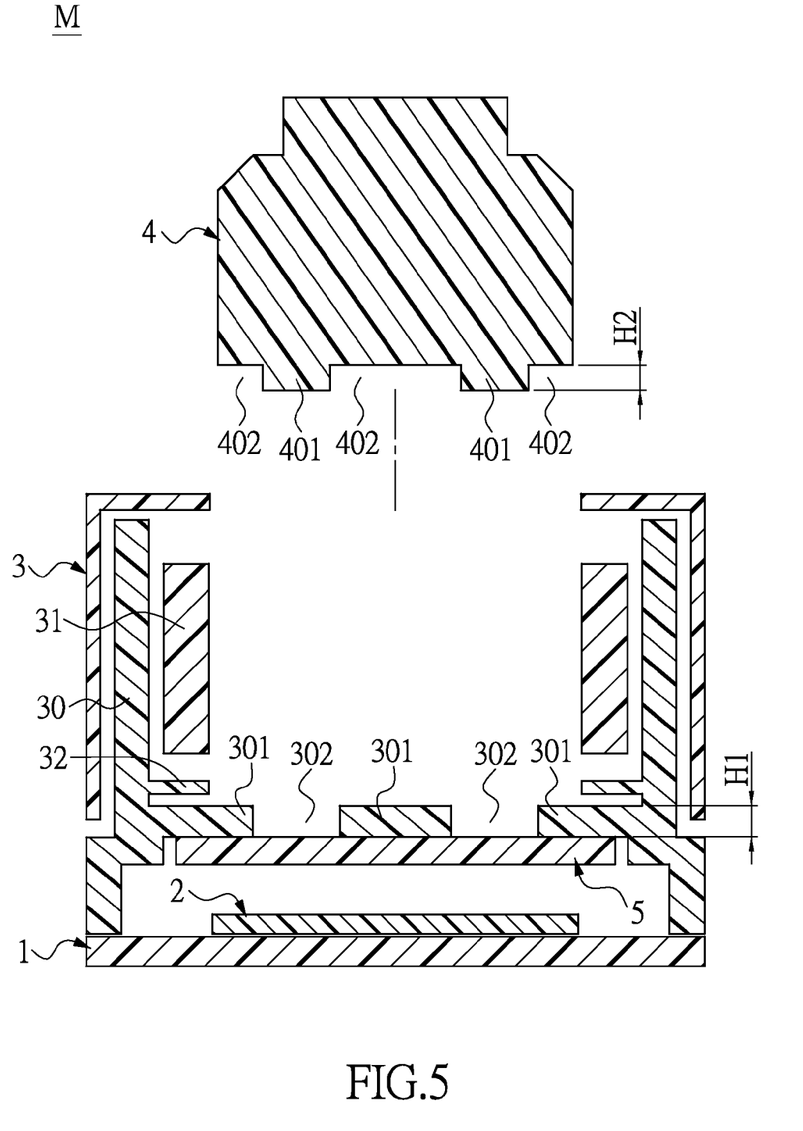
FIG. 5 shows a cross-sectional, schematic view of the lens assembly having not been assembled yet in the actuator module according to the instant disclosure.

Moreover, referring to FIG. 1 to FIG. 5, the actuator module 3 includes a holder 30 (especially shown in FIG. 5) disposed on the circuit substrate 1 to accommodate the image sensing element 2 that has been mounted on the circuit substrate 1. The lens assembly 4 is movably disposed inside the holder 30 of the actuator module 3. The light transmitting element 5 is disposed inside the holder 30 and between the lens assembly 4 and the image sensing element 2. For example, the actuator module 3 may be a voice coil motor (VCM) module for driving the lens assembly 4, thus the actuator module 3 further includes a threadless (or unthreaded) lens carrier 31 (i.e., a lens carrier without any thread or screw on the smooth periphery thereof) movably disposed inside the holder 30 and a stop structure 32 disposed inside the holder 30 to provide a stop function for restricting the lowest limit position of the threadless lens carrier 31 (as shown in FIG. 5), but it is merely an example and is not meant to limit the instant disclosure. In addition, the holder 30 is disposed on the circuit substrate 1 through adhesive glue (not shown), and the lens assembly 4 may be composed of a lens barrel 40 and a plurality of optical lenses 41 disposed inside the lens barrel 40. Besides, the light transmitting element 5 may be a filter (such as IR cut filter, blue glass filter, etc.) or a protection plate (such as a general protection glass plate without any coating, a protection glass plate having an antireflective coating, etc.) according to different requirements.

Figure 1:
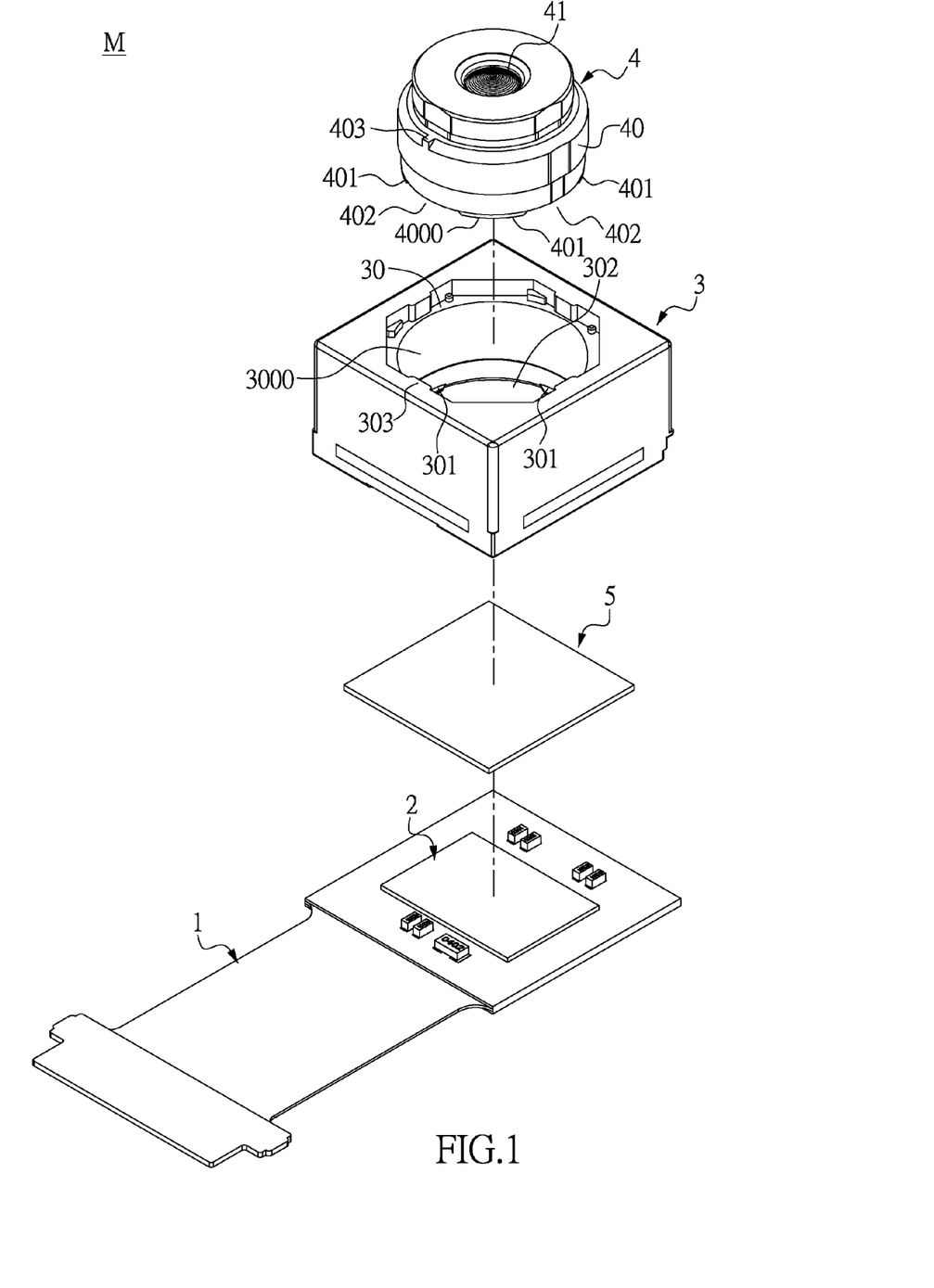
FIG. 1 shows a perspective, exploded, schematic view of the image capturing module of the instant disclosure.
Figure 2:
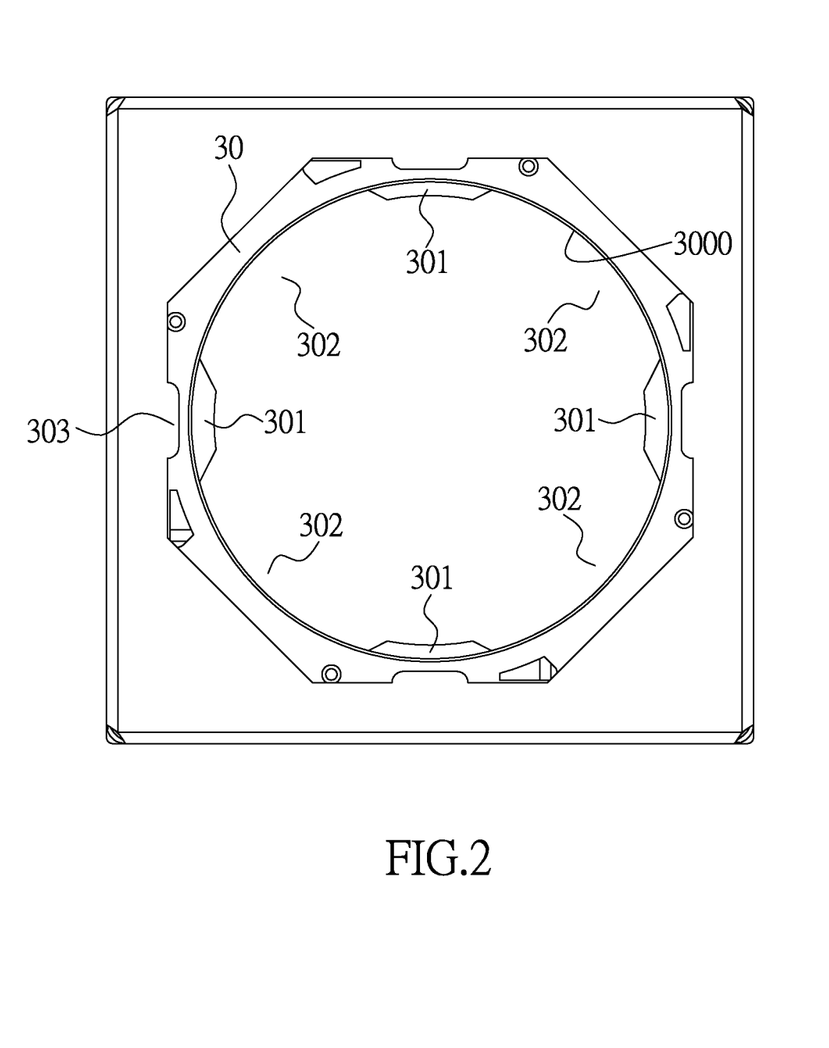
FIG. 2 shows a top, schematic view of the actuator module of the image capturing module of the instant disclosure.

Furthermore, referring to FIG. 1, FIG. 2 and FIG. 5 to FIG. 7, the holder 30 has a plurality of first protrusion portions 301 extended and protruded from the inner surface 3000 of the holder 30 and a plurality of first recess portions 302, where the first protrusion portions 301 and the first recess portions 302 can be alternately arranged on the inner surface 3000 of the holder 30 to form a continuous concave-convex annular structure, and the light transmitting element 5 is disposed on the bottom sides of the first protrusion portions 301 and adjacent to the image sensing element 2. Especially as shown in FIG. 2, some portions protruded from the inner surface 3000 of the holder 30 are the first protrusion portions 301, and each first recess portion 302 is a cut down portion (or a material reduction portion) between two adjacent first protrusion portions 301. In addition, referring to FIG. 1, FIG. 3 and FIG. 5 to FIG. 7, the lens assembly 4 has a plurality of second protrusion portions 401 that are respectively corresponding to the first recess portions 302 and extended and protruded from the bottom side 4000 of the lens assembly 4 and a plurality of second recess portions 402 that are respectively corresponding to the first protrusion portions 301, and the second protrusion portions 401 and the second recess portions 402 can be alternately arranged on the bottom side 4000 of the lens barrel 40 of the lens assembly 4 to form another continuous concave-convex annular structure. Especially as shown in FIG. 3, some portions concaved inwardly from the bottom side 4000 of the lens barrel 40 of the lens assembly 4 are second recess portions 402 shown as cut down portions, and each second protrusion portion 401 are shown as a convex portion between two adjacent second recess portions 402.

Figure 3:
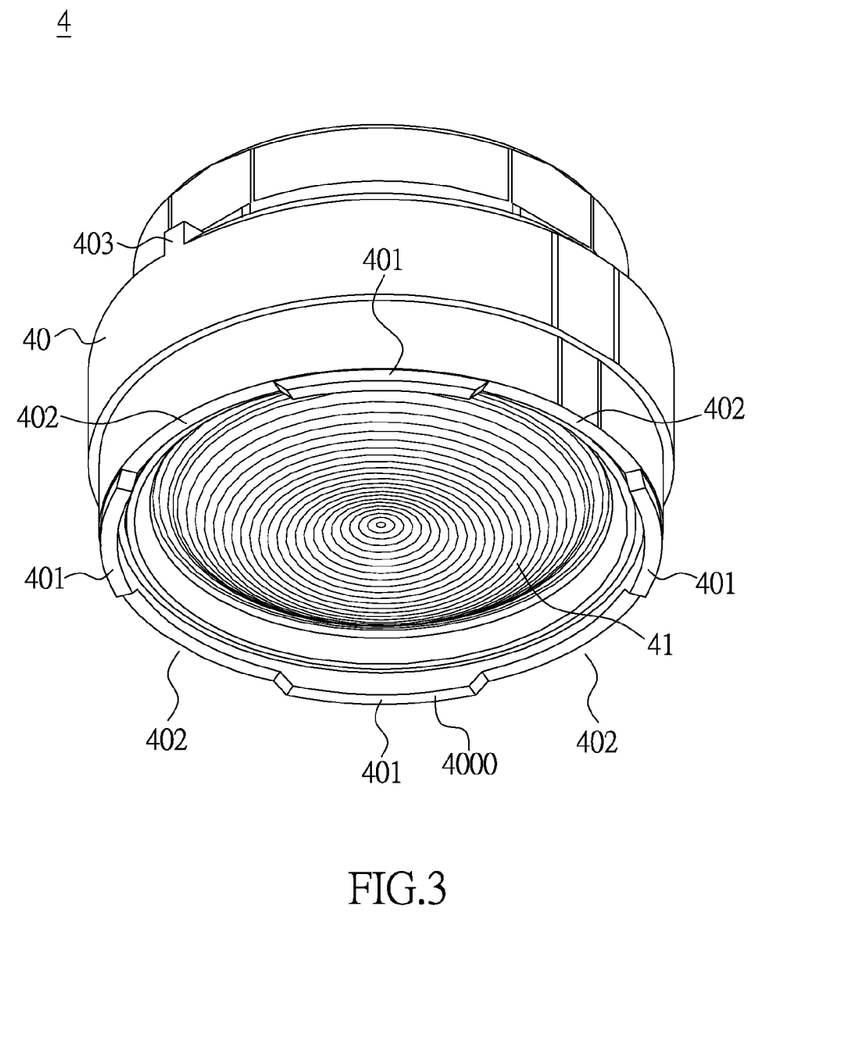
FIG. 3 shows a perspective, schematic view of the lens assembly of the image capturing module of the instant disclosure.
Figure 4:
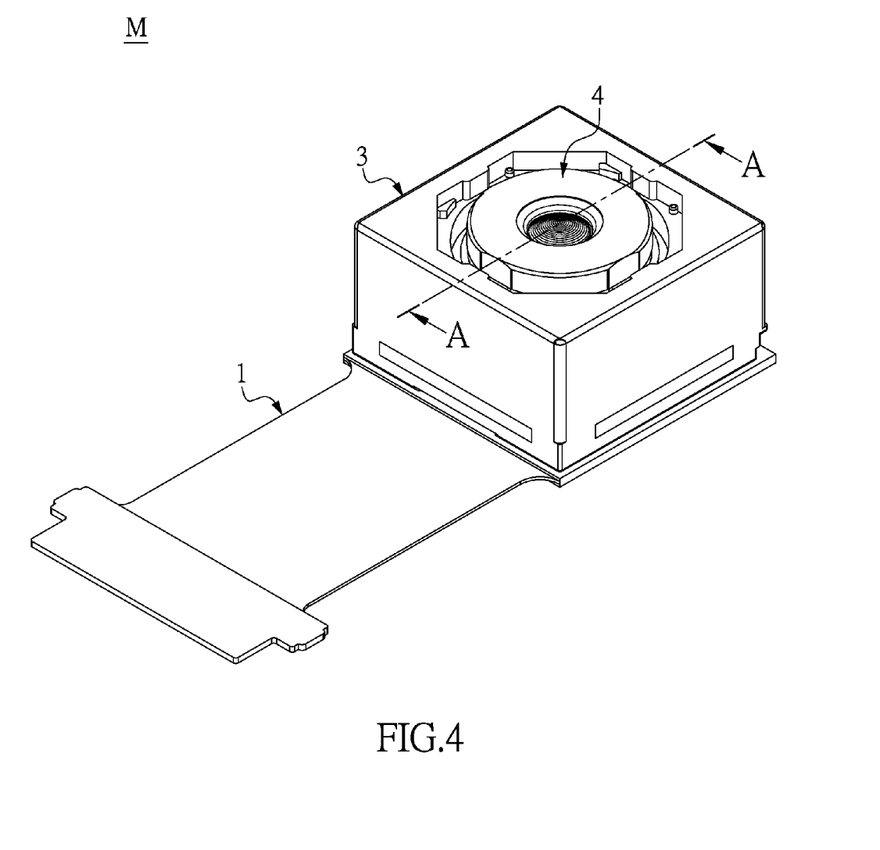
FIG. 4 shows a perspective, assembled, schematic view of the image capturing module of the instant disclosure.

It is worth noting that, referring to FIG. 1 to FIG. 3, the holder 30 has at least one first assembling reference portion 303 (such as a convex block integratedly disposed on the outer surface of the holder 30 in advance), and the lens assembly 4 has at least one second assembling reference portion 403 (such as a convex point integratedly disposed on the outer surface of the lens barrel 40 of the lens assembly 4 in advance) that is corresponding to the at least one first assembling reference portion 303. Especially for one foolproof design of the instant disclosure, both the at least one first assembling reference portion 303 and second assembling reference portion 403 are placed on obvious high positions for assembler to align the holder 30 with the lens barrel 40 easily, and the at least one first assembling reference portion 303 and second assembling reference portion 403 are separated from each other by a predetermined distance. Whereby, referring to FIG. 1, FIG. 5 and FIG. 6, when the at least one first assembling reference portion 303 and second assembling reference portion 403 are corresponding with each other to provide a foolproof function for assembler, the assembler can accurately assemble the lens barrel 40 of the lens assembly 4 in the holder 30 of the actuator module 3, and the lens assembly 4 can be fixed inside the threadless lens carrier 31 through fixing glue 42. At this moment, referring to FIG. 6, the second protrusion portions 401 are just respectively disposed above the first recess portions 302, the second recess portions 402 are just respectively disposed above the first protrusion portions 301.

More precisely, referring to FIG. 2, FIG. 3, FIG. 6 and FIG. 7, for example, the transverse cross-sectional shapes (taken along the section line A-A of FIG. 4) of the first recess portions 302 and the second protrusion portions 401 are substantially the same. Because the transverse cross-sectional area of the first recess portion 302 is larger than the transverse cross-sectional area of the second protrusion portion 401, the lens assembly 4 can be driven toward the light transmitting element 5 by the actuator module 3 and go downwardly to the end, and can allow the second protrusion portions 401 to respectively insert into the first recess portions 302. In addition, when the lens assembly 4 is firmly fixed inside the threadless lens carrier 31 through fixing glue 42, the lens assembly 4 and the threadless lens carrier 31 can be moved concurrently, thus an assembler can use the stop function provided by the stop structure 32 of the actuator module 3 to calculate and obtain a shortest anti-collision safety distance from the second protrusion portions 401 to the light transmitting element 5 in advance, wherein the shortest anti-collision safety distance is a shortest safety distance design for preventing the light transmitting element 5 from being collided with the second protrusion portions 401. Whereby, referring to FIG. 7, the designs of allowing the second protrusion portions 401 to respectively insert into the first recess portions 302 and obtaining the shortest anti-collision safety distance from the second protrusion portions 401 to the light transmitting element 5, thereby each second protrusion portion 401 and the light transmitting element 5 are separated from each other by a predetermined safety distance through the stop function that is provided by the stop structure 32 for preventing the light transmitting element 5 from being collided with the second protrusion portions 401.

Figure 6:
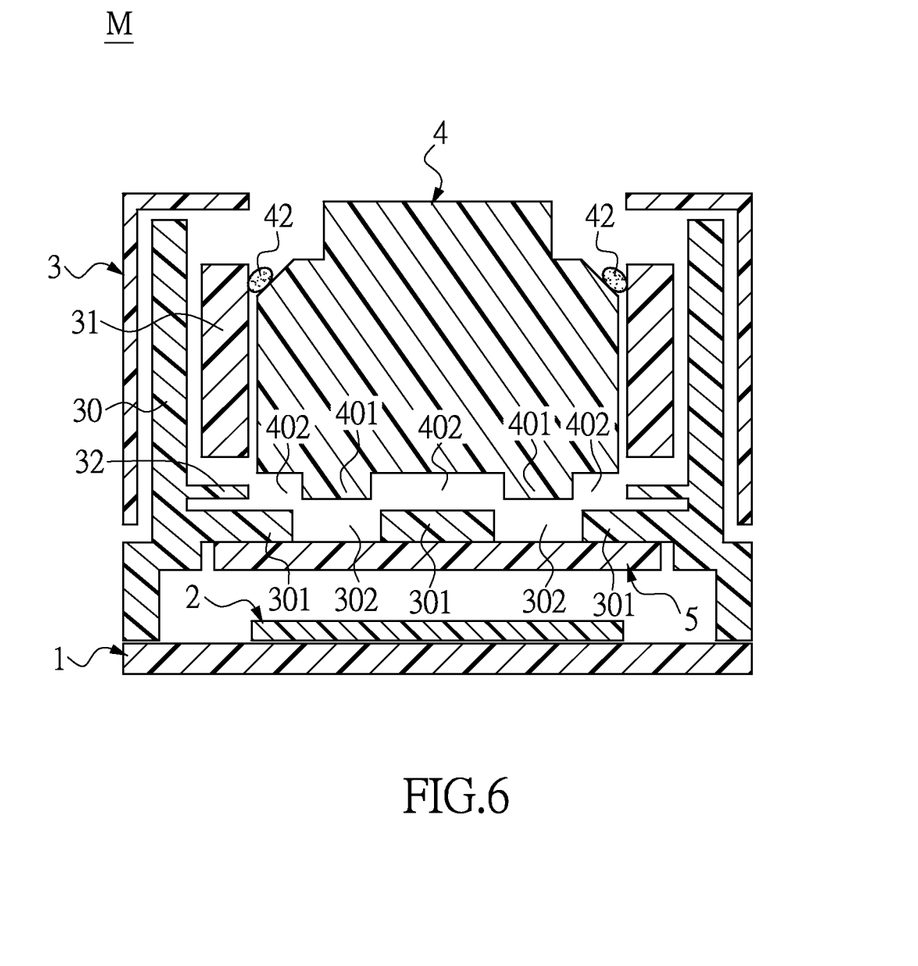
FIG. 6 shows a cross-sectional, schematic view of the lens assembly having been assembled in the actuator module according to the instant disclosure.

The same as the above-mentioned descriptions, referring to FIG. 2, FIG. 3, FIG. 6 and FIG. 7 again, for example, the transverse cross-sectional shapes (taken along the section line A-A of FIG. 4) of the second recess portions 402 and the first protrusion portions 301 are substantially the same. Because the transverse cross-sectional area of the second recess portion 402 is larger than the transverse cross-sectional area of the first protrusion portion 301, the lens assembly 4 can be driven toward the light transmitting element 5 by the actuator module 3 and go downwardly to the end, and can allow the first protrusion portions 301 to respectively insert into the second recess portions 402. In addition, when the lens assembly 4 is firmly fixed inside the threadless lens carrier 31 through fixing glue 42, the lens assembly 4 and the threadless lens carrier 31 can be moved concurrently, thus an assembler can use the stop function provided by the stop structure 32 of the actuator module 3 to calculate and obtain a shortest anti-collision safety distance from the first protrusion portions 301 to the lens assembly 4 in advance, wherein the shortest anti-collision safety distance is a shortest safety distance design for preventing the lens assembly 4 from being collided with the first protrusion portions 301. Whereby, referring to FIG. 7 again, the designs of allowing the first protrusion portions 301 to respectively insert into the second recess portions 402 and obtaining the shortest anti-collision safety distance from the first protrusion portions 301 to the lens assembly 4, thereby each first protrusion portion 301 and the lens assembly 4 are separated from each other by a predetermined safety distance through the stop function that is provided by the stop structure 32 for preventing the lens assembly 4 from being collided with the first protrusion portions 301.

In other words, the shortest anti-collision safety distance from the second protrusion portions 401 to the light transmitting element 5 or from the first protrusion portions 301 to the lens assembly 4 can be obtained according to the stop function provided by the stop structure 32 of the actuator module 3. Whereby, when the bottom surfaces of the second recess portions 402 of the lens assembly 4 are moved to the closest distance from the first protrusion portions 301 to the recess portions 402 by the actuator module 3, each second protrusion portion 401 can be partially inserted into the corresponding first recess portion 302, thus it is undoubted that the bottom surfaces of the second protrusion portions 401 cannot collide with the top surface of the light transmitting element 5. The same as the above-mentioned description, when the bottom surfaces of the second recess portions 402 of the lens assembly 4 are moved to the closest distance from the first protrusion portions 301 to the recess portions 402 by the actuator module 3, each first protrusion portion 301 can be partially inserted into the corresponding second recess portion 402, thus it is undoubted that the top surfaces of the first protrusion portions 301 cannot collide with the bottom surface of the second recess portion 402 of the lens assembly 4.

Referring to FIG. 5, it is worth mentioning that the height H1 (or thickness) of the first protrusion portion 301 can be larger than the height H2 (or thickness) of the second protrusion portion 401. Hence, when each second protrusion portion 401 is inserted into the corresponding first recess portion 302, because the allowable receiving height provided by the first recess portion 302 is larger than the height H2 of the second protrusion portion 401, each second protrusion portion 401 and the light transmitting element 5 are separated from each other by a predetermined safety distance for preventing the light transmitting element 5 from being collided with the second protrusion portions 401.

Figure 7:
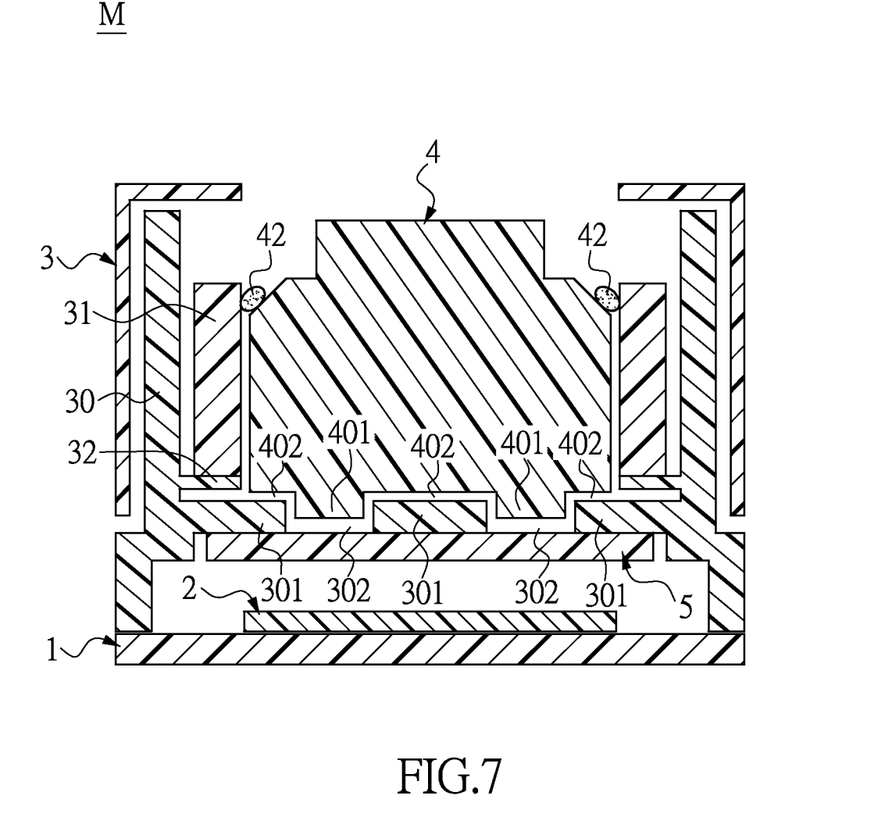
FIG. 7 shows a cross-sectional, schematic view of the lens assembly moved downwardly to the end according to the instant disclosure.

In a real application, when the lens assembly 4 is defined as a relative base for example and the first protrusion portions 301 and the second protrusion portions 401 are alternately arranged as shown in FIG. 7, the light transmitting element 5 is raised and approach relatively the lens assembly 4 by the designs of the cut down portions, thus the distance from the light transmitting element 5 to the lens assembly 4 can be decreased. In addition, when the distance from the light transmitting element 5 to the lens assembly 4 is decreased, the distance form light transmitting element 5 to the image sensing element 2 is increased. Hence, because the distance from the light transmitting element 5 to the image sensing element 2 is increased without changing the thickness of the light transmitting element 5, the opportunity of imaging the particles on the light transmitting element 5 is decreased. Therefore, both the image quality and the production yield of the image capturing module M are increased.

Figure 8:
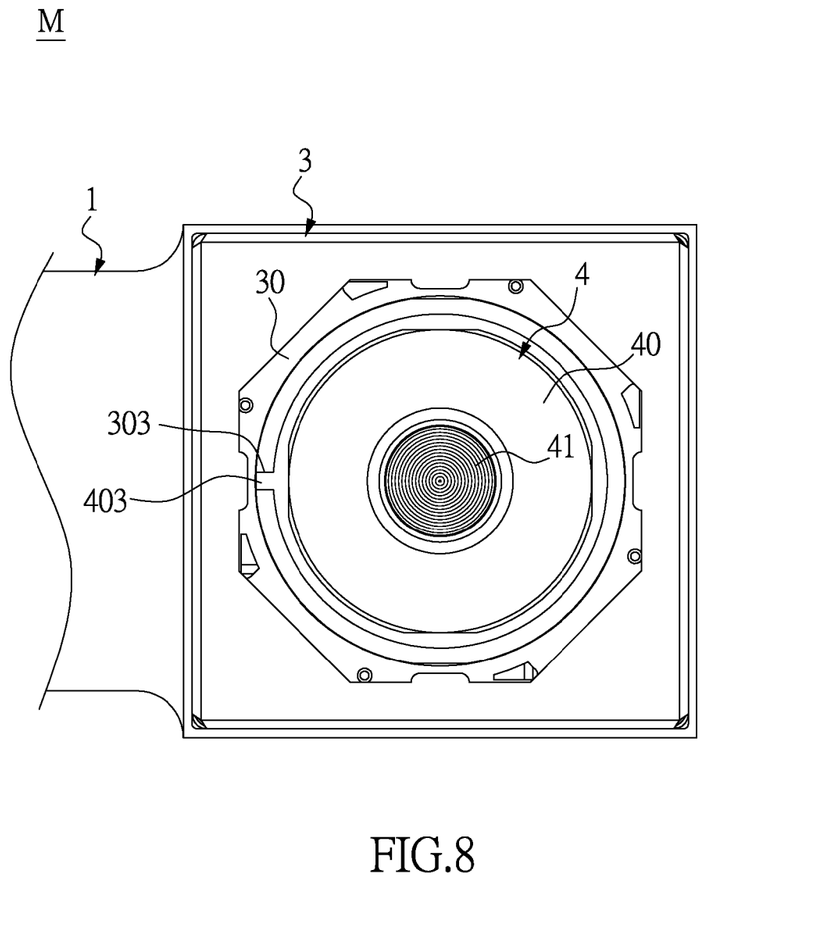
FIG. 8 shows a top, schematic view of using another first and second assembling reference portions according to the instant disclosure.

It is worth mentioning that the at least one second assembling reference portion 403 of the lens assembly 4 and the at least one first assembling reference portion 303 of the holder 30 can be contactingly mated with each other (such as an alignment design) or noncontactingly mated with each other (such as a foolproof design). For example, referring to FIG. 8, the at least one first assembling reference portion 303 may be a guiding groove, and the at least one second assembling reference portion 403 may be a guiding block received inside the guiding groove. Hence, when the guiding groove of the at least one first assembling reference portion 303 and the guiding block of the second assembling reference portion 403 are contactingly mated with each other, the assembler can accurately assemble the lens barrel 40 of the lens assembly 4 in the holder 30 of the actuator module 3.

In conclusion, because the designs of alternately placing the first protrusion portions 301 and the first recess portions 302 on the inner surface 3000 of the holder 30 and alternately placing the second protrusion portions 401 and the second recess portions 402 on the bottom side 4000 of the lens assembly 4, the distance from the light transmitting element 5 to the image sensing element 2 is increased without changing the thickness of the light transmitting element 5, the opportunity of imaging the particles on the light transmitting element 5 is decreased and the image quality and the production yield are increased.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An image capturing module, comprising:
    a circuit substrate;
    an image sensing element disposed on the circuit substrate and electrically connected to the circuit substrate;
    an actuator module including a holder disposed on the circuit substrate;
    a lens assembly movably disposed inside the holder; and
    a light transmitting element disposed inside the holder and between the lens assembly and the image sensing element;
    wherein the holder has a plurality of first protrusion portions and a plurality of first recess portions, and the first protrusion portions and the first recess portions are alternately arranged on the inner surface of the holder;
    wherein the lens assembly has a plurality of second protrusion portions that are respectively corresponding to the first recess portions and a plurality of second recess portions that are respectively corresponding to the first protrusion portions, and the second protrusion portions and the second recess portions are alternately arranged on the bottom side of the lens assembly;
    wherein the second protrusion portions are respectively disposed above the first recess portions, the second recess portions are respectively disposed above the first protrusion portions, and the height of the first protrusion portion is larger than the height of the second protrusion portion.

2. The image capturing module of claim 1, wherein the actuator module is a voice coil motor.

3. The image capturing module of claim 2, wherein the actuator module includes a threadless lens carrier movably disposed inside the holder and a stop structure disposed inside the holder to provide a stop function for the threadless lens carrier, and both the lens assembly and the threadless lens carrier are moved concurrently due to the design of firmly retaining the lens assembly inside the threadless lens carrier through fixing glue.

4. The image capturing module of claim 3, wherein each first protrusion portion is partially inserted into the corresponding second recess portion, and each first protrusion portion and the lens assembly are separated from each other by a predetermined safety distance through the stop function provided by the stop structure.

5. The image capturing module of claim 3, wherein each second protrusion portion is partially inserted into the corresponding first recess portion, and each second protrusion portion and the light transmitting element are separated from each other by a predetermined safety distance through the stop function provided by the stop structure.

6. The image capturing module of claim 1, wherein the transverse cross-sectional area of the first recess portion is larger than the transverse cross-sectional area of the second protrusion portion for allowing the second protrusion portions to respectively insert into the first recess portions.

7. The image capturing module of claim 1, wherein the transverse cross-sectional area of the second recess portion is larger than the transverse cross-sectional area of the first protrusion portion for allowing the first protrusion portions to respectively insert into the second recess portions.

8. The image capturing module of claim 1, wherein the transverse cross-sectional shapes of the first recess portions and the second protrusion portions are substantially the same.

9. The image capturing module of claim 1, wherein the transverse cross-sectional shapes of the second recess portions and the first protrusion portions are substantially the same.

10. The image capturing module of claim 1, wherein the light transmitting element is disposed on the bottom sides of the first protrusion portions and adjacent to the image sensing element.

11. The image capturing module of claim 1, wherein the holder has at least one first assembling reference portion, and the lens assembly has at least one second assembling reference portion that is corresponding to the at least one first assembling reference portion.

12. The image capturing module of claim 11, wherein the at least one first assembling reference portion and the at least one second assembling reference portion are contactingly mated with each other or separated from each other by a predetermined distance.

13. The image capturing module of claim 12, wherein the at least one first assembling reference portion is a guiding groove, and the at least one second assembling reference portion is a guiding block received inside the guiding groove.

14. The image capturing module of claim 1, wherein the light transmitting element is a filter.

15. The image capturing module of claim 1, wherein the light transmitting element is a protection plate.

\* \* \* \* \*